United States Patent
Poppendiek et al.

[11] 3,802,264
[45] Apr. 9, 1974

[54] FLUID TEMPERATURE DIFFERENTIAL FLOW METER

[75] Inventors: Heinz F. Poppendiek, La Jolla; Cullen M. Sabin, Solana Beach, both of Calif.

[73] Assignee: Geoscience Ltd., Solana Beach, Calif.

[22] Filed: July 10, 1972

[21] Appl. No.: 271,262

[52] U.S. Cl. .............................................. 73/204
[51] Int. Cl. ............................................ G01f 1/00
[58] Field of Search ................................... 73/204

[56] References Cited
UNITED STATES PATENTS

| | | | |
|---|---|---|---|
| 2,594,618 | 4/1952 | Booth, Jr. | 73/204 |
| 3,181,357 | 5/1965 | Benson | 73/204 |
| 3,500,686 | 3/1970 | Bell | 73/204 |
| 3,336,804 | 8/1967 | Poppendiek | 73/204 |
| 2,525,197 | 10/1950 | Beams et al. | 73/204 |
| 2,446,283 | 8/1948 | Hulsberg | 73/204 |
| 3,570,310 | 3/1971 | Densmore | 73/204 |

FOREIGN PATENTS OR APPLICATIONS

| | | | |
|---|---|---|---|
| 312,522 | 7/1925 | Germany | 73/204 |

*Primary Examiner*—Herbert Goldstein
*Attorney, Agent, or Firm*—Lyon & Lyon

[57] ABSTRACT

A fluid temperature differential flow meter involves a thin wall tube through which a liquid flows either alone or accompanied by the presence or flow of a gas. Heat is supplied from an external location through the tube to such liquid; and the resulting rise in temperature of the liquid in its flow between two spaced regions in such tube is measured using a series of cold and hot junctions in a thermopile also located externally of the tube. The electrical output of such thermopile serves as an indication of the rate of flow of the fluids. The source of heat and thermopile are located with respect to the tube to avoid or minimize so-called entrance region effects so that the relationship of the electrical output of the thermopile to flow rate is substantially linear although in inverse relationship. The thermopiles may in some instances be located inside of the flow tube. The flow tube may be a straight tube or in the form of a spiral tube or in other cases as a bent tube in which more thermocouples may then be used to advantage. A servo system may be incorporated to maintain the measured temperature constant while varying the amount of heat.

9 Claims, 8 Drawing Figures

PATENTED APR 9 1974 3,802,264

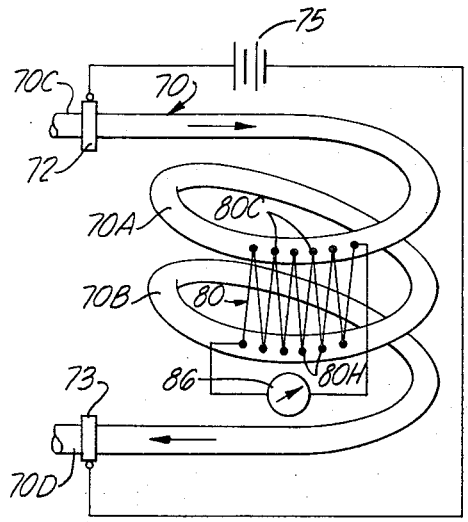
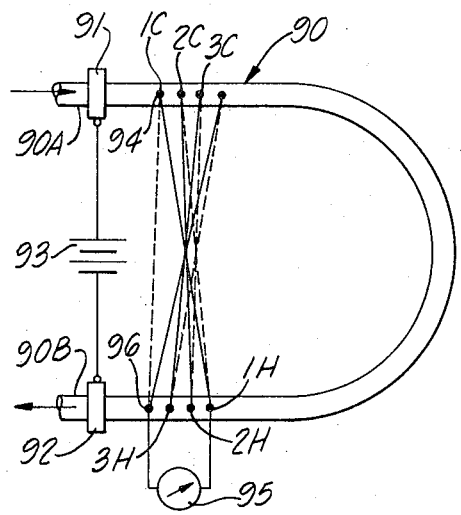
Fig. 5.　　　Fig. 6.
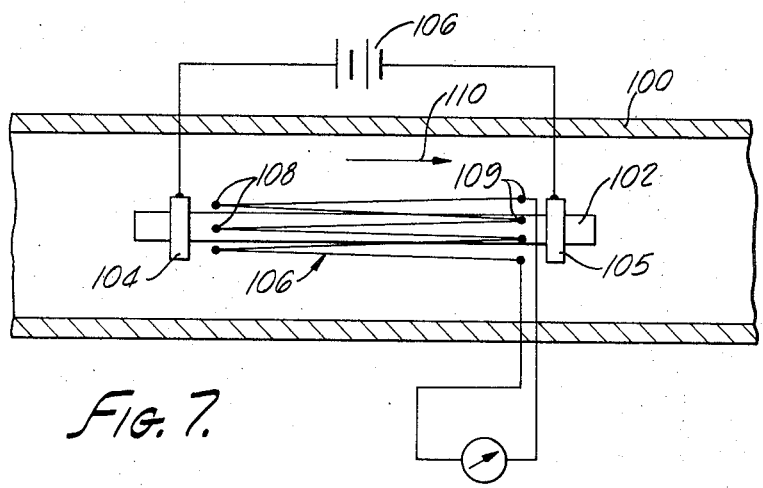
Fig. 7.
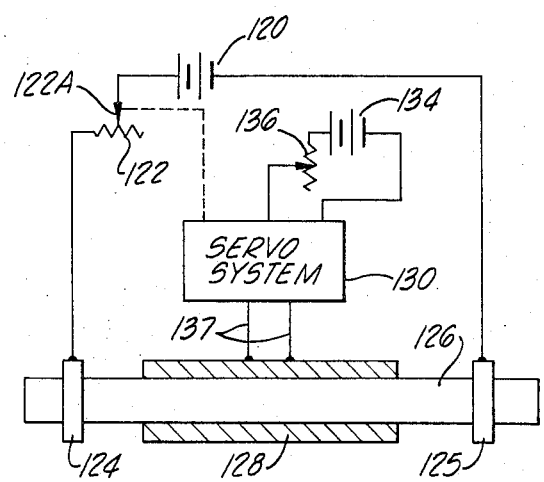
Fig. 8.

FLUID TEMPERATURE DIFFERENTIAL FLOW METER

The present invention relates to means and techniques useful in flow meters.

An object of the present invention is to provide a simple, reliable flow meter system which is universal in its application to different conditions involving, for example, the measurement of a single phase fluid rate in open tube, helical tube and bent tube systems or the measurement of two-component fluid flow rate in any one of such tube systems and as, for example, when the flow is a mixture of a liquid and a gas.

Another object of the present invention is to achieve the results indicated above using heat flow to raise the temperature of the fluid whose rate of flow is measured and measuring the rise in temperature between two spaced regions in a predetermined flow path.

Another object of the present invention is to provide a flow meter of this character in which the flow meter output signal is definitely relatable to the fluid flow rate and in substantial linear proportionate but inverse relationship thereto.

Another object of the present invention is to provide a flow meter of this character in which the relative arrangements of the temperature sensors and heater are such that mixed mean fluid temperature differences are determined accurately from wall temperature measurement and under such conditions that results may be predicted using simple but absolute heat flow equations such that under some conditions calibration may not be necessary.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 5 illustrates a modified arrangement in which the fluid flows through a spiral tube.

FIG. 6 illustrates another modification in which the fluid flows through a bent tube.

FIG. 7 illustrates another modification in which the thermocouples and associated heaters are mounted internally of the flow tube.

FIG. 8 illustrates a servo system used for maintaining measured temperature substantially constant while varying amount of heat supplied to the system.

Figure 1:
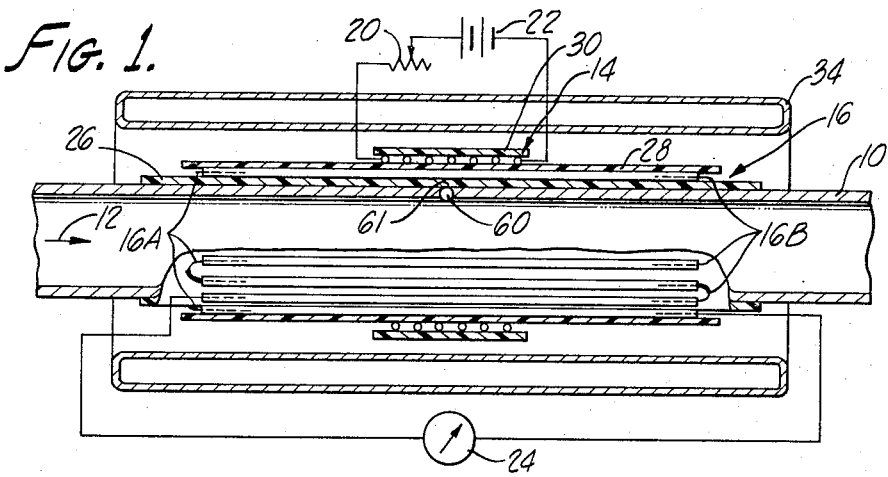
FIG. 1 is, in general, a longitudinal section through a flow meter system embodying features of the present invention.
Figure 2:
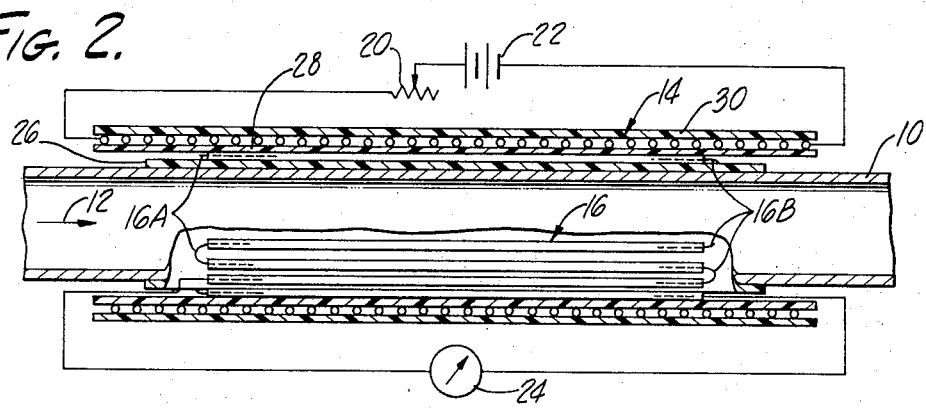
FIG. 2 is a view like FIG. 1 but of a modified system also embodying features of the present invention.
Figure 3:
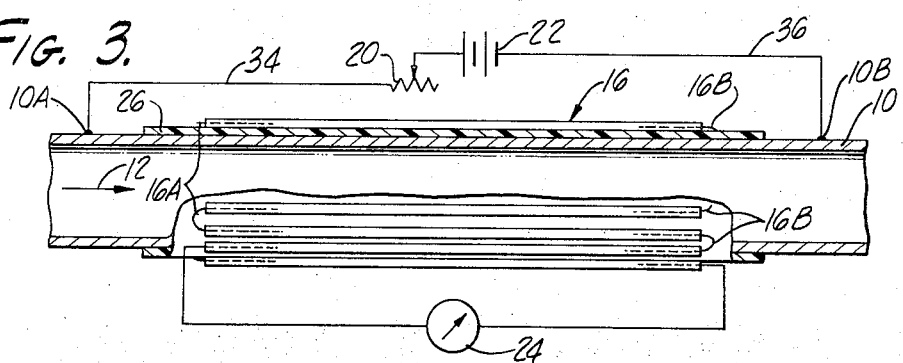
FIG. 3 is a view like FIG. 1 but of a further modified system also embodying features of the present invention.

In FIGS. 1–3, the flow being metered is within the tube 10 and in the direction from left to right as indicated by arrow 12. The material constituting such flow may be solely liquid, solid or gas or a combination of any of these three. The meters described herein are particularly useful when the flow is a liquid which does not completely fill the tube 10 but which may be accompanied by a gas that flows either at the same proportionate, different or variable rate with respect to the rate of liquid flow.

In FIG. 1, the flow exists in a thin wall metal tube 10 upon which a heater 14 and a thermopile structure 16 are mounted. It is contemplated that substantially all heat from the heater 14 flows radially and uniformily inwardly into the tube 10 to raise the temperature of the material flowing therein from a relatively low temperature as sensed by the series of cold junction thermocouples 16A to a relatively high temperature as sensed by the other series of hot junction thermocouples 16B.

The heater 14 is supplied with heating current which flows in the series electrical circuit comprising: heater 14, adjustable resistance 20 and voltage or current source 22.

The thermocouples 16A are connected in series with each other and in series with the thermocouples 16B and in series with meter 24. The meter 24 indicates the current flowing through the thermopile 16, and such current indicator serves also as an indication of the difference in material temperature between on the one hand at the location in thermocouples 16A and on the other hand, the location of thermocouples 16B.

The thermopile 16 as well as the heater 14 are electrically insulated from each other and from tube 10 which is of metal but which in FIGS. 1 and 2 may be of insulating material. For illustrative purposes, FIG. 1 includes a thin sleeve 26 of insulating material on which the thermopile 16 is wound, it being noted that the "turns" of such thermopile winding extend longitudinally of the sleeve 26 and also tube 10. The thermopile 16 is otherwise generally of conventional construction and, as illustrated, involves plating of a conductor of dissimilar metal along selected lengths thereof.

A second sleeve of insulating material 28 may surround the thermopile 16 for electrical insulating the thermopile from the heater 14.

As indicated previously, substantially all heat flow from heater 14 is inwardly towards and into the tube 10; and to assure this direction of heat flow, the region outside of heater 14 is thermally insulated using, for example, a heavy thick layer of good heat insulating material 30 which for like purposes may be surrounded by a vacuum cylinder 34.

In comparing FIGS. 1 and 2 wherein like elements have the same reference numerals, it will be seen that whereas in FIG. 1 the heater 14 is relatively short in length and is disposed between the series of thermocouples 16A, 16B, in FIG. 2 the heater 14 is relatively long and extends between and beyond the series of spaced thermocouples 16A, 16B. In both instances, however, preferably the heater 14 and thermopile 16 are symmetrically or centrally disposed relative to each other so that the same assembly may be used for measurement of flow in either direction through tube 10 with the important feature being that for the same flow, regardless of its direction, the reading of meter 24 is then the same.

It will be appreciated that the heater may be positioned closer to the tube 10 than the thermopile 16 instead of as illustrated in FIGS. 1 and 2. Indeed, as in FIG. 3, the electrical resistance of the metal tube 10 may be used to develop the heat instead of there being a separate heater. Thus in FIG. 3, the heating current flows from electrical source 22, through adjustable resistance 20, conductor 34 which is connected to tube 10 at point 10A, through a section of tube 10 to a point 10B where a conductor 36 is attached to provide a path for current flow to source 22.

During measurements of heat flow in the simplest form of the invention, the rate of heat development is maintained constant accomplished by adjustment of resistance 20, if necessary. The needle of meter 24 is then deflected an amount inversely proportional to the flow rate in tube 10 since the greater the material flow, the less is its rise in temperature between the series of thermocouples, and hence the smaller the deflection of the meter needle or pointer.

An important aspect of these arrangements is that the true mixed mean fluid temperature differences are obtainable so that absolute equations between flow and temperature differences can be established, thereby avoiding necessity of calibration.

Figure 4:
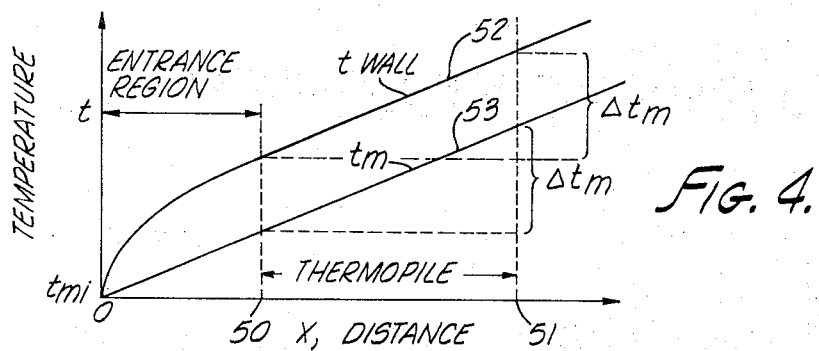
FIG. 4 illustrates in graphical form temperature-distance relationship in flow meters of the type described herein.

Thus as indicated in FIG. 4, the thermopile is located between points 50, 51 between which the wall temperature (represented by graph 52) increases linearly with respect to distance therealong between points 50, 51 as does also the mean temperature of the flowing material (represented by graph 53). The change of metered temperature $\Delta t_m$ as measured by the thermocouples 16A, 16B located respectively at points 50, 51 is a measure of the flow rate. When as in FIGS. 2 and 3 the heat source is prolonged to encompass the thermopile, its cold junction is located well within the heated zone to minimize or eliminate entrance region effects.

The above description assumes the flow of a liquid which is heated and thus carries away the heat developed in the heater. Theroretically, when there is infinite fluid flow, there is substantially no temperature rise, and hence the electrical output of the thermopile is substantially zero. In comparison, there is a second condition wherein the output of the thermopile is substantially zero; namely, when there is no fluid flow. Thus in refinement of the present invention additional means, presently described, may be used to distinguish between infinite fluid flow and zero fluid flow. Such means may involve the addition of a temperature sensor such as a thermocouple 60 located on the tube 10 at the thermopile midpoint 61 so as to obtain an electrical output representative of the temperature of tube 10 at that midpoint 61. When there is a high fluid flow, the tube wall temperature as deduced by the thermocouple 60 is nearly the same as the fluid temperature as deduced by the thermopile 16. On the other hand, when there is no flow, the tube 10 is of greatly increased temperature, and the temperature as deduced by thermocouple 60 is then relatively high in comparison to the temperature as deduced by thermopile 16. Thus that one of the two possible conditions may be ascertained by comparing the temperature as sensed by thermocouple 60 with the temperature as sensed by thermopile 16 and when the two temperatures thus determined are relatively close in value, the thermopile output readings are indeed representative of actual fluid flow.

Further, in order to avoid the possibility of overheating of the tube 10 during no fluid flow conditions, the thermocouple 60 sensing the temperature of tube 10 may be used to control the heating source 22. Alternately, a thermal switch may be included in the heater power circuit such that when the temperature of heater 14 increases beyond a certain temperature, the power circuit is then deactivated or controlled to furnish less heating energy.

Instead of using a straight flow conducting tube as illustrated in FIGS. 1–3, the tube may be a spiral tube as shown in FIG. 5 or a bent tube as shown in FIG. 6.

In FIG. 5, the spiral tube 70 of metal is exemplified as having two convolutions 70A, 70B between its straight end portions 70C, 70D. Heat is applied to the material flowing through the tube by providing the straight sections 70C, 70D with electrodes 72, 73 to which opposite terminals an electric current source is connected to produce a heating current along the length of tube 70 between such electrodes.

A thermopile construction 80 involving a series of cold junctions 80C and a series of hot junctions 80H extends between convolutions 70A, 70B with the series of junctions 80C being spaced along and on the convolution 70A and the series of junctions 80H being spaced along and on corresponding adjacent portions of convolution 70B. These junctions are connected in series with meter 86 which indicates the rise in temperature between convolutions occasioned by the heating current flowing through the tube 70.

Preferably the distance between each hot and corresponding cold junction as measured along the fluid flow path is equal for each pair of such hot and cold junctions.

In FIG. 6 the bent metal tube 90 through which material flows is heated by applying heating current from current source 93 to the electrodes 91, 92 mounted on the straight tube portions 90A, 90B.

The series of cold junctions 94 are on the straight portion 90A, and the series of hot junctions 96 are on the straight portion 90B. Preferably as in FIG. 5 the spacing of each pair of hot and cold junctions as measured along the fluid flow path inside the tube are equal, and this is accomplished by winding or disposing the thermopile such that the first cold junction 1C and the first hot junction 1H of the same pair are located furthermost upstream and progressively each next succeeding pair is located further downstream as indicated by the positioning of thermocouple pairs 2C, 2H; 3C, 3H, etc. As previously mentioned, all junctions are connected in series with a meter 95 for indication of temperature difference.

The arrangements of FIGS. 5 and 6 have the advantage of allowing the use of a greater number of thermocouples in a configuration which provides in general increased sensitivity, i.e. greater electrical output and compactness.

In FIG. 7 both the heating means and thermopile are positioned inside of the flow tube 100. The heating means is in the form of an electrical conductor such as a metal rod 102 on opposite ends of which are electrodes 104, 105 connected to a heating current source 106. Mounted on such rod 102 is a thermopile construction 106 having a series of cold junctions 108 upstream and a series of interconnected hot junctions 109 downstream with reference to fluid flow which is indicated by arrow 110, these junctions 108, 109 being connected in series with meter 110 which indicates temperature difference between location of the hot junctions 109 on the one hand and the location of cold junctions 108 on the other hand.

FIG. 8 illustrates a somewhat different mode of operation using any one of the arrangements previously described. In this case, the electrical output of the thermopile, i.e. the measured temperature differential, is maintained constant using a servo system to automatically change the amount of heating current so as to achieve electrical output of substantially constant intensity.

As exemplified, the heating current source 120, adjustable resistance 122, and electrodes 124, 125 on metal flow tube 126 are in a series circuit to heat the material flowing through such tube. The temperature difference as measured by the thermopile 128 in the form of an electrical signal is applied to the servo system via leads 137. A second current input is supplied to servo system 130 by the series connected reference source 134 and associated adjustable series resistance 136. The two current inputs to the servo system are compared by the servo system 130; and as a result of such comparison, the tap 122A on resistance 122 is adjusted to change the electrical heating of tube 126 in such direction and such amount to maintain the electrical signal on leads 137 substantially constant at a nominal value. Such nominal value may, in turn, be changed, if and when desired, by adjustment of the tap on resistance 136.

It may be demonstrated that in general there is an energy balance in accordance with the following equations when a material flow comprising component 1 and component 2 occurs in the flow tube $$g_H = (m_1 C_{p_1} + m_2 C_{p_2}) \Delta t_m \quad (1)$$

where $g_H$ represents the power developed in the heater expressed in, for example, BTU/hr $m_1$ is the mass flow of component 1 expressed in, for example, pounds per hour.

$C_{p_1}$ is the specific heat or heat capacity of component 1 expressed, for example, in BTU per pound degrees Fahrenheit.

$p$ is the mass flow of component 2

$C_{p_2}$ is the specific heat or heat capacity of component 2

$\Delta t_m$ is the temperature difference measured by the thermopile expressed in, for example, degrees Fahrenheit.

This relation may be expressed also as follows:

$$m_1 = \frac{g_H}{\left[ C_{p_1} + \left( \frac{1-X}{X} \right) C_{p_2} \right]} \Delta t_m \quad (2)$$

where $X$ is equal to $m_1/m_1+m_2$

Component 1 may, for example, be water, and component 2 may be an accompanying air flow. This value, X, is usually known for a flow system or may be established from a volume percentage and density evaluation.

In this specific example using a mixture of water and air flowing through a tube under equal volume conditions, the flow rate quantities $m_1$ and $m_2$ are then proportional to the densities or masses. Because of the approximate 12,000 fold difference in the masses, the effect of the presence of the air is nil. Thus accurate measurements are available without the flow tube being completely filled with water.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. A flow meter system including a conduit for the flow of material being metered; heater means arranged to produce heat uniformly along said conduit from one region thereon to a second region thereon spaced in the direction of material flowing in said conduit to heat said material flowing through said conduit whereby the temperature of the material is increased progressively from said one region to said second region; a first section of the conduit extending from said one region upwardly in the direction of incoming material flow and a second section extending downwardly from said one region in a space between said one and said second region and said first and second sections having progressively lower non-linear temperatures and defining an entrance region wherein said material is initially heated; thermopile means mounted externally of said conduit and having a first series of upstream cold junctions spaced longitudinally along said conduit from a second series of downstream hot junctions; and means connected to said thermopile and indicating the electrical output of said hot and cold junctions; said first and said second series of junctions each being between said one region and said second region with said series of cold junctions being positioned sufficiently downstream from said first region to be outside of said entrance region and with the temperature of such conduit between said regions increasing linearly.

2. A system as set forth in claim 1 in which said conduit is a tube.

3. A system as set forth in claim 2 in which said tube is a thin wall of metal.

4. A system as set forth in claim 1 in which said heater means is the electrical resistance of said conduit.

5. A system as set forth in claim 1 in which said conduit is a spiral conduit with the series of cold junctions being on one convolution of the spiral conduit and the series of hot junctions being on another convolution.

6. A system as set forth in claim 5 in which the spacing between different pairs of each corresponding cold and hot junction pair as measured along the path of fluid flow in the spiral conduit is substantially the same.

7. A system as set forth in claim 1 in which said conduit is a bent tube defined by two leg portions thereof with the series of cold junctions being on one of said leg portions and with the series of hot junctions being on the other of said leg portions.

8. A system as set forth in claim 7 in which the spacing between different pairs of each corresponding cold and hot junction pair as measured along the path of fluid flow in the bent tube is substantially the same.

9. A system as set forth in claim 1 including a servo system responsive to the output of said thermopile means and functioning in response thereto to control said heater means such that the output of said thermopile means is maintained substantially constant.

\* \* \* \* \*